United States Patent

[11] 3,586,429

| [72] | Inventor | Paul H. Cords, Jr. |
| | | Silver Spring, Md. |
| [21] | Appl. No. | 746,230 |
| [22] | Filed | July 19, 1968 |
| [45] | Patented | June 22, 1971 |
| [73] | Assignee | The United States of America as represented by the Secretary of the Navy |

[54] METHOD AND APPARATUS FOR OPTICALLY RECORDING DUAL IMAGES
9 Claims, 2 Drawing Figs.

[52] U.S. Cl. ................................................. 352/93,
95/18, 352/45, 352/46, 352/62, 352/94
[51] Int. Cl. ............................................... G03b 19/18
[50] Field of Search .......................................... 352/57, 60,
62, 63, 65, 93, 94, 46, 43, 45; 350/147; 95/18

[56] References Cited
UNITED STATES PATENTS

| 2,348,410 | 5/1944 | Pastor | 352/62 |
| 2,360,322 | 10/1944 | Harrison | 95/18 |
| 2,450,761 | 10/1948 | MacNeille | 350/147 UX |
| 2,568,327 | 9/1951 | Dudley | 95/18 |
| 2,807,198 | 9/1957 | Resnik | 352/93 |

FOREIGN PATENTS

| 552,582 | 4/1943 | Great Britain | 352/62 |

*Primary Examiner*—John M. Horan
*Assistant Examiner*—Alan Mathews
*Attorneys*—S. P. Fisher, R. S. Sciascia and J. A. Cooke ABSTRACT: A method and apparatus for optically recording dual images of the same body wherein a first image is reflected directly into a camera through a light discriminating filter, and a second image of the body is reflected into the camera through an optical path defined by an arrangement of reflective surfaces having a second light discriminating filter in the path such that the two images may be discriminated after recording.

PATENTED JUN22 1971

3,586,429

Paul H. Cords, Jr.
INVENTOR

BY

ATTORNEY

AGENT 3,586,429

METHOD AND APPARATUS FOR OPTICALLY RECORDING DUAL IMAGES

BACKGROUND OF THE INVENTION

This invention relates generally to optical recording systems, and more particularly to a dual image optical recording method and apparatus.

The design of aerodynamic bodies necessitates experimenting and testing with models of various aerodynamic shapes to enable the designer to accurately predict the flight characteristics of the body under various conditions. One method of determining the aerodynamic characteristics of a body is accomplished by experimentation in a wind tunnel. It is highly desirable to obtain a photographic record of various views of the body while in the wind tunnel under aerodynamic conditions.

Prior art systems for obtaining photographic records of more than one image of the body under aerodynamic conditions in a wind tunnel have been limited to the utilization of separate optical arrangements for each image recorded. Systems producing separate photographic recordings for each image desired necessitate the difficult and undesirable steps of synchronization and correlation of the various photographic records to produce an accurate record of the behavior of an aerodynamic body within a wind tunnel.

SUMMARY OF THE INVENTION

Accordingly, one object of this invention is to provide a new and improved optical system for recording dual images.

Another object of the invention is the provision of a new and improved optical system for simultaneously recording dual images.

Still another object of the present invention is to provide a new and improved optical system for alternately recording dual images.

A further object of the instant invention is to provide a new and improved dual image optical system capable of recording and distinguishing two images of the same object.

A still further object of this invention is the provision of a new and improved dual image optical system capable of distinguishing between two superimposed images of the same object which are simultaneously recorded.

One other object of this invention is the provision of a novel method for optically recording dual images of the same body.

Briefly, in accordance with one embodiment of this invention, these and other objects are obtained by providing a dual image optical system having a surface for receiving light rays reflected from a body, a beam splitter in a direct line of optical alignment with the surface and the body permitting light rays reflected from the body to pass therethrough to impinge on the surface, a light reflector angularly disposed to the direct line of optical alignment for reflecting light rays reflected from the body onto the beam splitter, a first light filter in the direct line of optical alignment between the body and the beam splitter, and a second light filter between the body and the body and the beam splitter in the same optical path with the light reflector.

BRIEF DESCRIPTION OF THE DRAWINGS

A more complete appreciation of the invention and many of the attendant advantages thereof will be readily appreciated as the same become better understood by reference to the following detailed description when considered in connection with the accompanying drawings wherein.

DESCRIPTION OF THE PREFERRED EMBODIMENT

Figure 1:
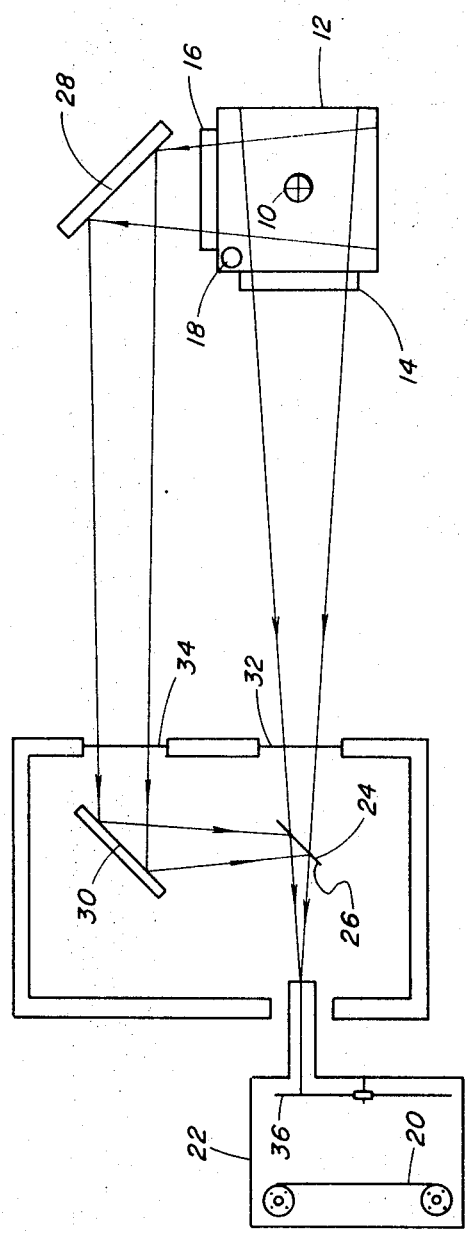
FIG. 1 is a diagrammatic side plane view of the overall system of the present invention.

Referring now to the drawings wherein like reference characters designate identical or corresponding parts throughout the several views, and more particularly to FIG. 1 thereof wherein an aerodynamic body 10 is schematically illustrated as mounted within a wind tunnel 12 having transparent windows 14 and 16 for permitting two separate images of the body 10 to be viewed at the same time. An illuminating member 18 may be provided within wind tunnel 12 to provide white light to the surface of body 10 such that the body may be photographed during aerodynamic testing.

A flat surface such as a screen or strip of motion picture film 20 is illustrated as mounted within a high speed camera 22 arranged in direct optical alignment with window 14 such that an image of body 10 is directly reflected through window 14 into camera 22 to be recorded on film 20. A beam splitter 24 such as a conventional gelatin pellicle is provided in the optical path between body 10 and camera 22 and is transparent to permit the reflected light to pass therethrough. The beam splitter 24 has a reflective surface 26 to reflect light impinging thereon into the camera 22. A light reflector 28 is angularly disposed in indirect optical alignment with window 1 to reflect a second image of body 10 passing through window 16 along a second optical path to impinge on a second reflector 30 and then to the reflective surface 26 of beam splitter 24 whereon the second image of body 10 is superimposed upon the first image of body 10 such that both images are viewed by camera 22 simultaneously.

To enable the camera 22 to distinguish between the two images being simultaneously received, a first light filter 32 is provided in the direct line of optical alignment between the body 10 and the beam splitter 24, and a second light filter 34 is provided the body 10 and the beam splitter 24 in the same optical path with the light reflector means 28 and 30. Light filter 32 and 34 may either be of different colors, for example filter 32 may be blue and filter 34 red, or filters 32 and 34 may be polarizing filters having the direction of polarization of filter 34 angularly disposed to the direction of polarization of filter 32.

Figure 2:
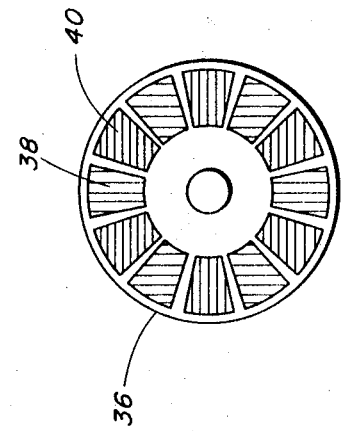
FIG. 2 is a front plane view of a shutter disc which may be utilized with the system of FIG. 1.

If it is desired to record the first and second images of body 10 on alternate frames of the film 20, a shutter disc 36 may be provided in camera 22 for alternately filtering out the first and second images of body 10. As shown more clearly in FIG. 2, the shutter disc 36 has a plurality of filters 38 and 40 extending through the surface thereof in a circumferentially complete ring. If light filters 32 and 34 are color discriminating such as red and blue, then filters 38 and 40 would be alternating red and blue color discriminating filter. The shutter disc 36 is mounted within camera 22 in such a manner that it is rotated at the same speed as film 20 such that alternate frames of the film 20 receive only that light passing through either filter 38 or filter 40. When the light filters 32 and 34 are polarizing filters having their axes of polarization angularly disposed to each other, then the filters 38 and 40 on shutter disc 36 would also be polarizing filters having their axes of polarization similarly angularly disposed relative to each other.

As can be seen from the above description, the present invention provides a complete optical method and apparatus for recording either simultaneously or alternately two images of the same body on a single roll of film. When used in conjunction with experimental work in a wind tunnel, it is very important to be able to simultaneously record several images of the aerodynamic body under test, and the system of the present invention enables simultaneous recording without necessitating synchronization of several cameras and correlation of several recordings.

Obviously, numerous modifications and variations of the present invention are possible in light of the above teaching. It is therefore to be understood that within the scope of the appended claims the invention may be practiced otherwise thus as specifically described herein.

What I claim as new and desired to be secured by Letters Patent of the United States is:

1. A dual image optical system comprising surface means for receiving light rays reflected from a body:
   a beam splitter in a direct line of optical alignment with said surface means and said body permitting light rays reflected from said body to pass therethrough to impinge on said surface means,
   a plurality of light reflectors angularly disposed relative to said direct line of optical alignment including a light reflector disposed to receive said light rays reflected from said body orthogonal to said direct line of optical alignment,
   first light filter means in said direct line of optical alignment between said body and said beam splitter, and
   second light filter means disposed in the optical path of said plurality of light reflectors between said body and said beam splitter.

2. The apparatus of claim 1 wherein said surface means includes a high speed motion picture film.

3. The apparatus of claim 1 wherein said first light filter means transmits a portion of the light spectrum different from said second light filter means.

4. The apparatus of claim 1 further including a shutter disc between said film and said beam splitter having light filters of the same light transmitting characteristics as said first light filter means alternating with light filters of the same light transmitting characteristics as said second light filter means, whereby alternate frames of said film will record alternate views of said body.

5. The apparatus of claim 1 wherein said first and second light filter means are polarizing filters having their directions of polarization angularly disposed relative to each other.

6. The apparatus of claim 1 wherein said beam splitter is a gelatin pellicle.

7. A method of optically recording dual images of orthogonal views of the same body comprising the steps of focusing a first image of a body on an image plane:
   superimposing a second image of an orthagonal view of the same body on said image plane,
   filtering the light producing said first and second images such that they may be distinguished, and
   recording said superimposed images.

8. The method of claim 7 wherein said images are simultaneously recorded.

9. The method of claim 7 wherein said images are alternately recorded.